July 20, 1965  F. C. HAUTH ETAL  3,195,505
RABBIT AND GUINEA PIG HOLDING CAGE
Filed Dec. 19, 1962  3 Sheets-Sheet 1
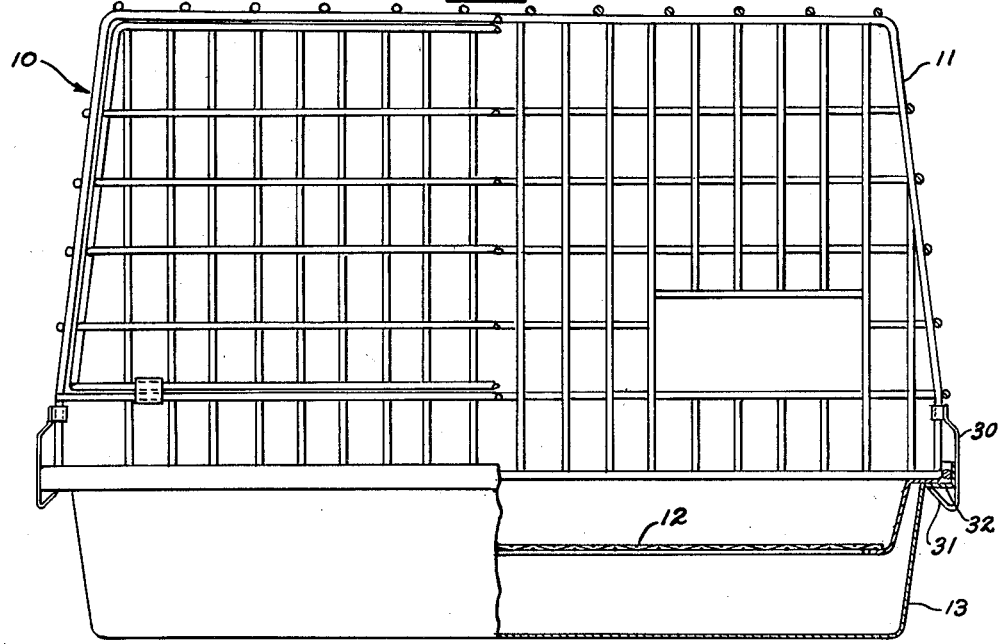
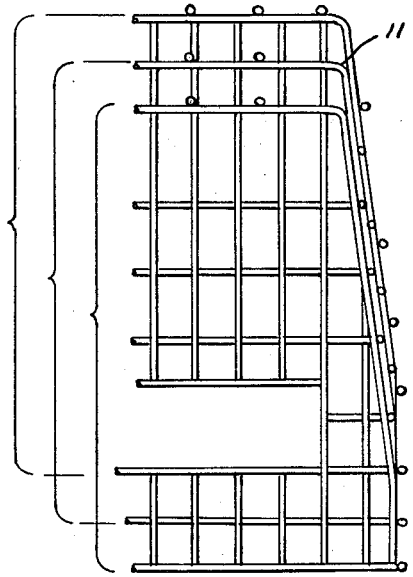
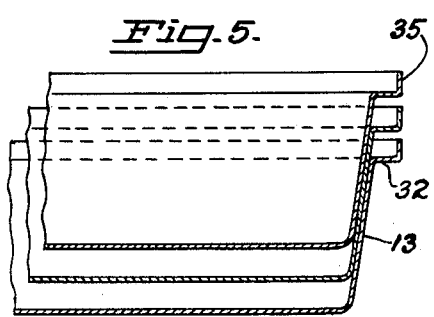
INVENTORS
FRED C. HAUTH
MARK A. CHATIGNY
BY
ATTORNEY July 20, 1965 F. C. HAUTH ETAL 3,195,505
RABBIT AND GUINEA PIG HOLDING CAGE
Filed Dec. 19, 1962 3 Sheets-Sheet 2
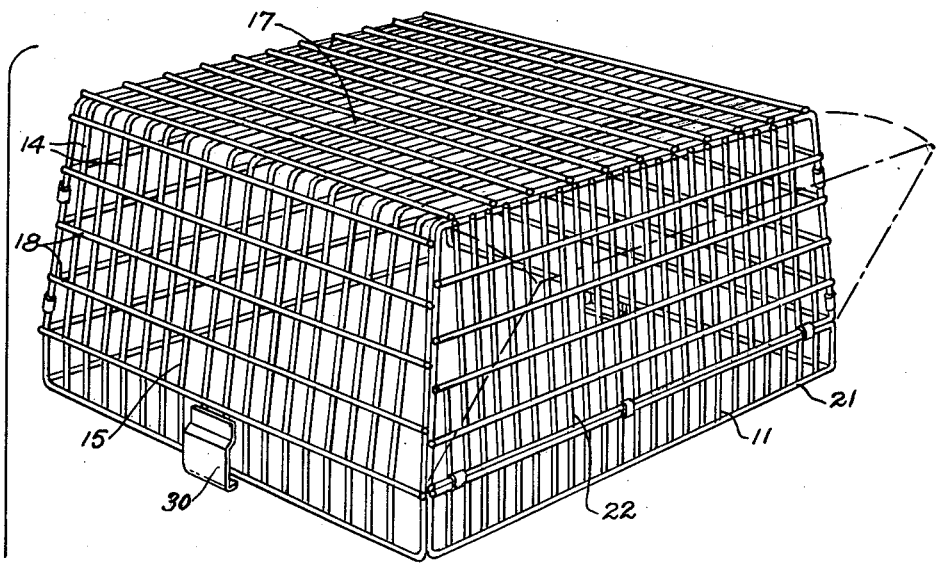
Fig. 2.
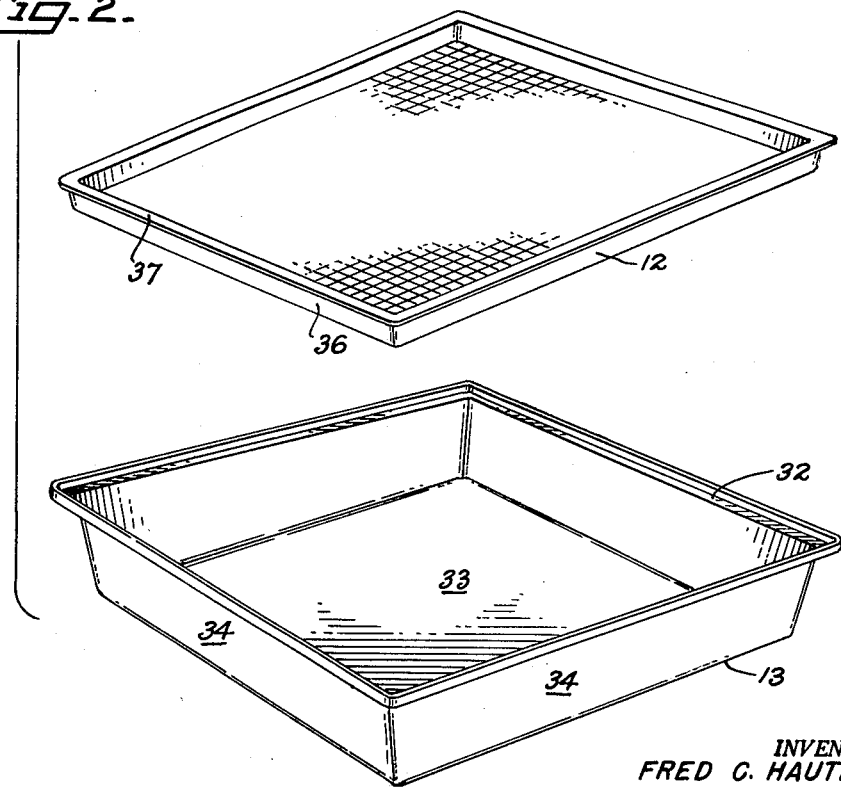
INVENTORS
FRED C. HAUTH
MARK A. CHATIGNY
BY
ATTORNEY

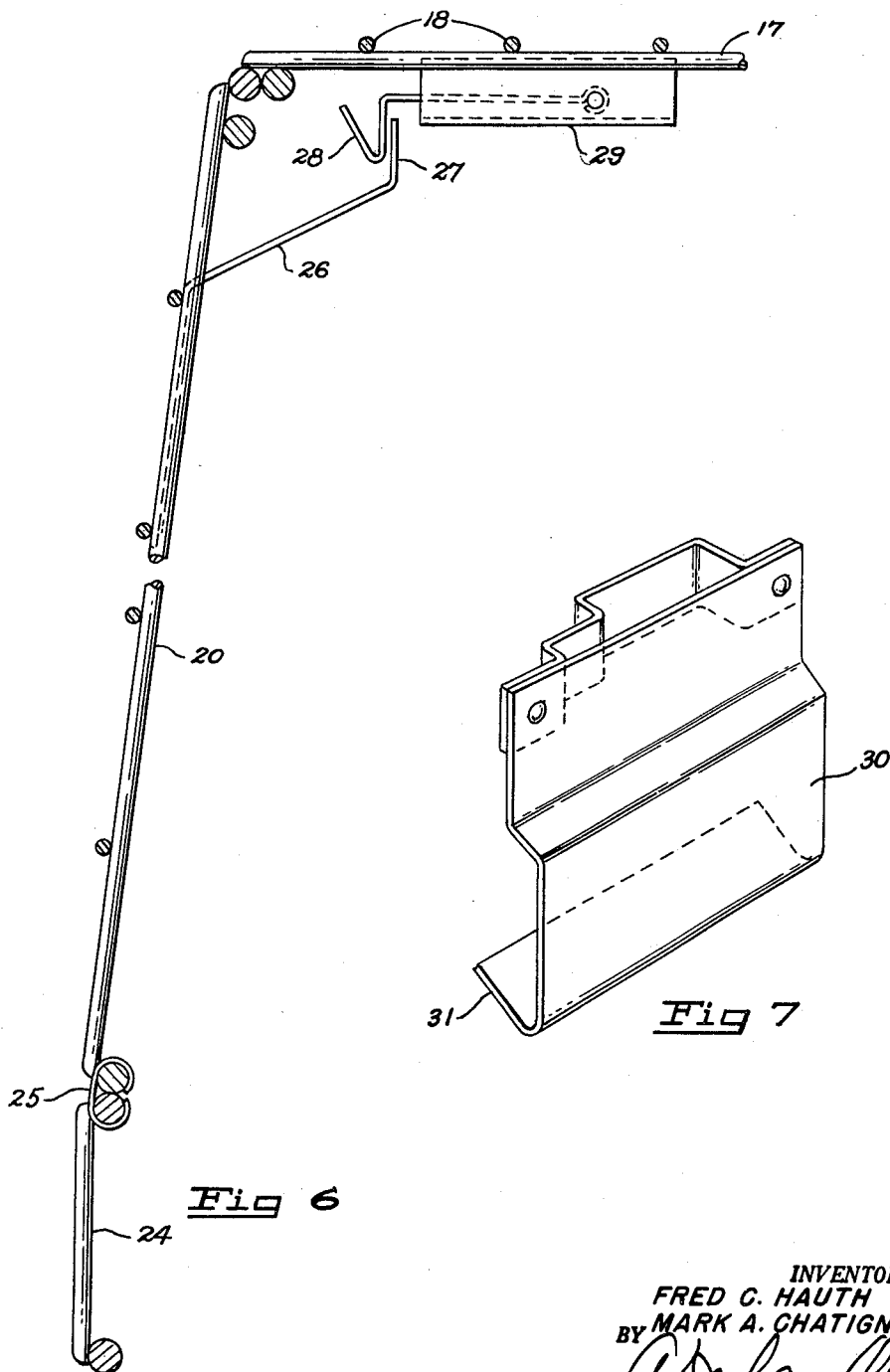

United States Patent Office
3,195,505
Patented July 20, 1965

3,195,505
RABBIT AND GUINEA PIG HOLDING CAGE
Fred C. Hauth, Pleasant Hill, and Mark A. Chatigny, San Lorenzo, Calif., assignors to The Regents of the University of California, Berkeley, Calif.
Filed Dec. 19, 1962, Ser. No. 245,724
7 Claims. (Cl. 119—17)

This invention relates to an improved caretaking cage for small animals such as rabbits and guinea pigs that are commonly used in laboratories for research purposes.

At the various medical or biological research institutions throughout the country large numbers of rats, mice, rabbits, guinea pigs and other small animals are kept and used for research programs of many types. With the steadily increasing volume of such research work the problem arose of providing a more efficient and effective cage for handling the small animals being used in the various programs. More specifically, there arose a serious need for a cage that was easy to clean and store, that would occupy less space when being sterilized, that would ensure better sanitation and environment for the animal, and that would keep the animal off its bedding when necessary. The principal object of the present invention is to provide an improved cage for small animals that solves the aforementioned problems and is particularly adaptable for use in research laboratories.

Of all the aforementioned problems, one of the most serious was that relating to the cleaning, storing and sterilization of the cages. The animal cages heretofore used were rigid and non-collapsible and generally oblong in shape, and thus they required a large amount of space when stored in large numbers. This was particularly troublesome when it became necessary to sterilize the cages in enclosed chambers.

It is therefore a particularly important object of our invention to provide a cage for small animals suitable for use in research laboratories that can be quickly and easily disassembled into a small number of major components all of which can be nested with similar components of other cages for storage and when placed in sterilization chambers.

Another object of my invention is to provide a knocked-down animal cage adaptable for use in research laboratories that has a unique construction particularly well adapted for ease and economy of manufacture.

Still another object of the present invention is to provide an animal cage for use in laboratories that is extremely durable, yet light in weight.

Another object of the present invention is to provide an animal cage that can be disassembled into knocked-down form without the need for special tools or complicated procedures.

Other objects, advantages and features of my invention will become apparent from the following description of a preferred embodiment thereof presented in accordance with 35 USC 112.

In the drawings:
FIG. 1 is a view in elevation and partially in section of a portable animal caretaking cage embodying the principles of the invention;
FIG. 2 is an exploded view in perspective showing the upper grille portion, the grated floor portion, and the bottom portion of the animal cage shown in FIG. 1;
FIG. 3 is a fragmentary view in elevation and in section showing a plurality of grille portions of the animal cage according to the invention when stacked for storage or cleaning;
FIG. 4 is a fragmentary view in elevation and in section of a plurality of grated floor portions of the animal cage in FIG. 1;
FIG. 5 is a fragmentary view in elevation and in section of a plurality of nested bottom portions of the animal cage in FIG. 1;
FIG. 6 is a greatly enlarged view in elevation and in section showing a portion of the upper grille section of the animal cage of FIG. 1;
FIG. 7 is an enlarged view in perspective showing in detail an attaching member for the upper grille section.

Referring now to the drawings, FIG. 1 shows a portable animal cage 10 embodying the principles of the invention as it appears when fully assembled and in use in a laboratory or some other research facility. The cage 10 comprises three major components, namely, an upper wire lattice portion 11 forming the main enclosure, a grated or pervious floor portion 12, and a lower base portion 13. All of these components have generally a frusto-pyramidal configuration so that when the cage 10 is disassembled the members 11, 12 and 13 can be readily nested together for storage or cleaning as illustrated in FIGS. 3–5.

As shown in FIG. 2 the upper lattice portion 11 of the cage 10 has a frusto-pyramidal shape and is preferably made from a plurality of rigid wire members which are preformed and welded together to form a mesh enclosure of the desired size. A central portion of the upper portion is formed by a series of inverted generally U-shaped and spaced apart wire members 14 that form opposite sides 15 and 16 and a roof portion 17. A series of spaced apart horizontal wires 18 extend across and are welded to the wire members 14 to form the mesh pattern of this central section. The other sides of the lattice portion 11 of the cage 10 are formed by separate upright side members 19 and 20 formed from a series of horizontal and vertical wire members 21 and 22 respectively. The side member 19 is fixed to the central portion of the upper portion 11 between the sides 15 and 16 by metal clips or bands 23 that extend around the edge wire members of both the central member and the side members 19 and 20. The other side member 20 is hinged to a horizontal frame member 24 connected to the opposite sides 15 and 16 near the bottom edge of the upper cage portion 11 by a series of metal clips or bands 25 so that it can pivot thereon and provide a door for the cage (see FIG. 2). A suitable latch 26 is provided on the door side member 20 to retain it in the closed position. As shown in FIG. 6, the latch 26 comprises a resilient sheet metal member with a bent end flange 27 adapted to engage and fit behind the end hook 28 of a catch member 29 fixed to the roof portion 17 of the central cage portion 11.

Connected to some vertical wire members 14 on both opposite sides 15 and 16 of the central cage portion 11 is a connecting hook member 30 shown in detail in FIG. 7. The hook member 30 is formed from resilient sheet metal and when fixed in position it extends outwardly and downwardly towards the lower base member 13. At its lower end it has an inwardly and upwardly extending lower lip portion 31 that is adapted to fit around and up under a peripheral flange portion 32 on the lower base member 13.

As shown in FIG. 2, the lower base member 13 is made from sheet metal and has a generally rectangular bottom 33 and a frusto-pyramidal shape formed by upwardly divergent side walls 34. Around its upper edge is the horizontally extending edge flange portion 32 of uniform width that is connected at its outer edge to an upwardly extending edge portion 35. As stated above, the underside of the flange portion 32 supports the hook members 30 that connect the upper cage member 11 to the base member 13 while the flange 32 itself supports the pervious floor member 12. The upturned edge 35 functions to hold the upper cage member 11 in the proper alignment with the base member 13 when the cage 10 is assembled.

The grated floor member 12 also shown in FIG. 2 has a rectangular shape and a bottom portion formed from either a wire screen or a suitable expanded metal material having a relatively small mesh pattern. The floor member 12 also preferably has frusto-pyramidal shape with upwardly divergent side walls 36 that are considerably smaller in width than the side walls 34 of the lower base member 13. Around the upper edge of the side walls 36 is a peripheral flange portion 37 which is adapted to rest on the peripheral flange 32 of the base member 13. The grated or pervious floor member 12 enables the animal in the cage 10 to be supported above the bottom 33 of the base portion 13 so that it will remain clean for an extended period.

When the cage 10 is assembled, it is a compact unit in which an animal can be housed with a maximum of cleanliness and efficiency. On the rear side of the cage, dispensing devices for food and water (not shown) may be supported on the cross wires 18 of the grille or lattice cage member 11. When it becomes necessary to clean the cage which usually requires inserting it into a sterilizing oven, the animal and auxiliary dispensing devices are removed from the cage and the upper cage member 11 is removed by springing the attaching hook clips 30 outwardly and lifting the member 11 upward. The floor member 12 and the lower base member 13 can be similarly separated, and all three of these major components 11, 12 and 13 can then be nested with components of other cages as shown in FIGS. 3–5 and placed in sterilization ovens where they will take up a minimum of space during the cleansing operation.

To those skilled in the art to which this invention relates, many changes in construction and widely differing embodiments and applications of the invention will suggest themselves without departing from the spirit and scope of the invention. The description and the disclosures herein are purely illustrative and not intended to be in any sense limiting.

We claim:

1. A knocked-down caretaking cage for animals comprising:
   an upper cage member of wire lattice construction having sloped sidewalls and an open bottom;
   a lower base member having sloped sidewalls substantially smaller in height than the sidewalls of said upper cage member and edges defining an open top and removably connected to said upper cage member;
   a pervious intermediate animal floor member supported between said upper and lower members on said edges;
   all three of said members having a generally frusto-pyramidal shape whereby said cage can be readily disassembled and the separated members can be nested with other similar members of like cages for storage or cleaning.

2. A knocked-down caretaking cage for animals comprising:
   an upper wire lattice member having an open bottom;
   a sheet metal base member having sidewalls and outwardly extending upper side wall portions, an impervious bottom and an open top and a height substantially less than that of said upper member;
   a pervious intermediate member supported by said base member above its bottom on said wall portions;
   means for removably attaching said upper lattice member to said base member;
   all of said members having a generally frusto-pyramidal shape with an open side having more area than any of its other sides, whereby when said cage is disassembled, the separated members can be nested with other similar members of like cages for storage or cleaning.

3. A knocked-down caretaking cage for small animals comprising:
   an upper grille member of wire mesh having an open bottom and downwardly divergent side walls and thereby having a generally frusto-pyramidal shape;
   a base member of sheet metal having outwardly extending flanges defining an open top, an impervious bottom and upwardly divergent sidewalls forming a generally frusto-pyramidal shape and having a height substantially less than that of said upper grille member;
   an intermediate grate member retained within said base member above its bottom, said intermediate member having an open top defined by a peripheral flange portion resting on other said flanges, a screen bottom and upwardly divergent side walls thereby also forming a generally frusto-pyramidal shape;
   and means for retaining said members together in a predetermined fixed relationship when said cage is in use with said intermediate member being located between said grille and base member.

4. A knocked-down caretaking cage for small animals comprising:
   an upper cage member of wire mesh having an open bottom and downwardly divergent side walls and thereby having a generally frusto-pyramidal shape;
   a lower cage member having an impervious bottom and upwardly divergent side walls forming an open top and thereby having generally frusto-pyramidal shape, and a generally horizontal peripheral flange extending outwardly from the upper edges of said side walls on said lower member;
   an intermediate grate member retained within said lower cage member above its bottom and supported on said flange, said intermediate member having a pervious bottom and upwardly divergent side walls forming an open top and thereby having a generally frusto-pyramidal shape;
   and clip means attached to said upper cage member and extending downwardly therefrom for retaining said members together when said cage is in use with said intermediate member being located between said grille and base member, said clip means having bent up end portions fitting under said flange on said base member.

5. A knocked-down caretaking cage for small animals comprising:
   an upper cage member of wire mesh with downwardly divergent side walls forming an open bottom, said upper member thereby having a generally frusto-pyramidal shape, one of said sidewalls including a hinged portion for providing access to said cage when it is assembled;
   a base member having an open top and upwardly divergent sidewalls forming a generally frusto-pyramidal shape and a flange extending outwardly from the edges of said base member sidewalls;
   an intermediate grate member retained within said base member above its bottom, said intermediate member having an open top, a pervious bottom and upwardly divergent side walls thereby forming a generally frusto-pyramidal shape, and a peripheral flange extending outwardly from the edges of its sidewalls adapted to rest on said flange of said base member;
   and resilient clip means for retaining said members together when said cage is in use with said pervious intermediate member being located between said grille and base member.

6. A knocked-down caretaking cage for small animals comprising:
   an upper cage member of wire mesh with downwardly divergent side walls forming an open bottom, said upper member thereby having a generally frusto-pyramidal shape;
   a base tray member for supporting said upper cage member having an open top and upwardly divergent sidewalls forming a generally frusto-pyramidal shape, a generally horizontal flange extending outwardly from the upper edges of said base member sidewalls and a generally vertical flange extending upwardly from the edge of said horizontal flange;

an intermediate grate member adapted to be retained within said base member above its bottom, said intermediate member having an open top, a pervious bottom and sidewalls having a width less than the sidewalls of said base tray member, and a peripheral flange extending generally horizontally and outwardly from the edges of its sidewalls and resting on said horizontal flange of said base member whereby said pervious bottom is maintained above the bottom of said base tray member;

and means for retaining said members together when said cage is in use with said pervious intermediate member being located between said grille and base member, and the lower edge of said upper cage member being retained inside the generally vertical flange of said base tray member.

7. A knocked-down caretaking cage for small animals comprising:

an upper cage member of wire mesh with downwardly divergent side walls forming an open bottom, said upper member thereby having a generally frusto-pyramidal shape;

a base tray member for supporting said upper cage member having an open top and upwardly divergent sidewalls forming a generally frusto-pyramidal shape, a first flange extending outwardly from the edges of said base member sidewalls and a second flange extending upwardly from the edge of said first flange;

an intermediate grate member retained within said base member above its bottom, said intermediate member having an open bottom, a pervious bottom and upwardly divergent sidewalls thereby forming a generally frusto-pyramidal shape, said latter sidewalls having a width less than the sidewalls of said base tray member, and a peripheral flange extending outwardly from the edges of its sidewalls and adapted to rest on said first flange of said base member;

and means for retaining said three members together when said cage is in use with said pervious intermediate member being located between said grille and base member and the lower edge of said upper cage member being retained within the generally vertical flange of said base tray member.

References Cited by the Examiner

UNITED STATES PATENTS

| | | | |
|---|---|---|---|
| 2,684,051 | 7/54 | Leblond et al. | 119—18 |
| 2,914,022 | 11/59 | Hinton | 119—17 |
| 2,971,493 | 2/61 | Robb | 119—1 |
| 2,988,044 | 6/61 | Adelberg et al. | 119—18 |
| 3,029,788 | 4/62 | Voss | 119—1 |
| 3,063,413 | 11/62 | Fuller et al. | 119—18 |
| 3,122,127 | 2/64 | Schechmeister et al. | 119—18 |

FOREIGN PATENTS 230,429   7/60   Australia.

SAMUEL KOREN, *Primary Examiner.*

ALDRICH F. MEDBERY, *Examiner.*